Nov. 16, 1948.　　　　J. E. ALLEN　　　2,453,957
MAGNETIC CLUTCH
Filed Aug. 22, 1945　　　　　　　3 Sheets-Sheet 1
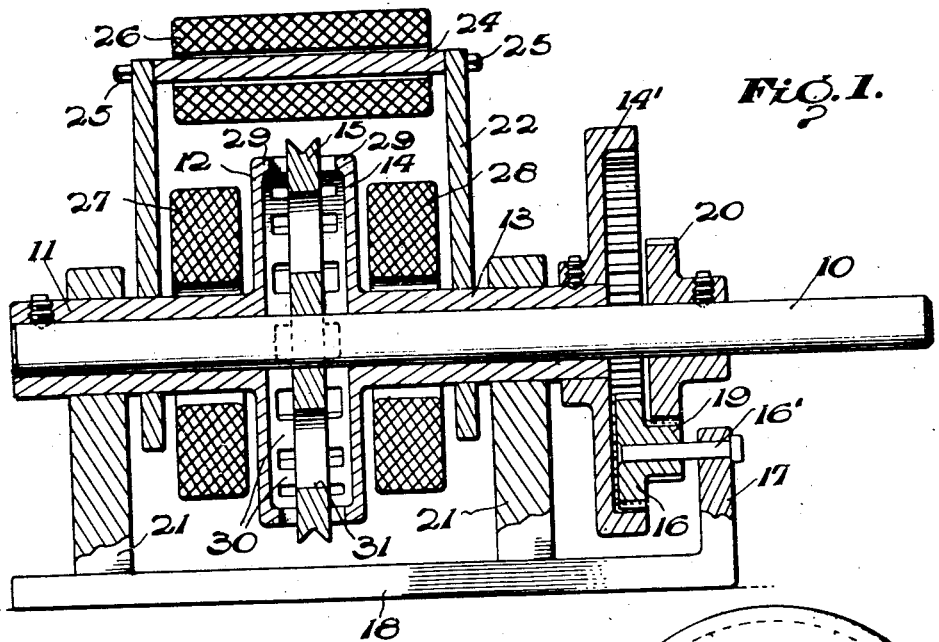
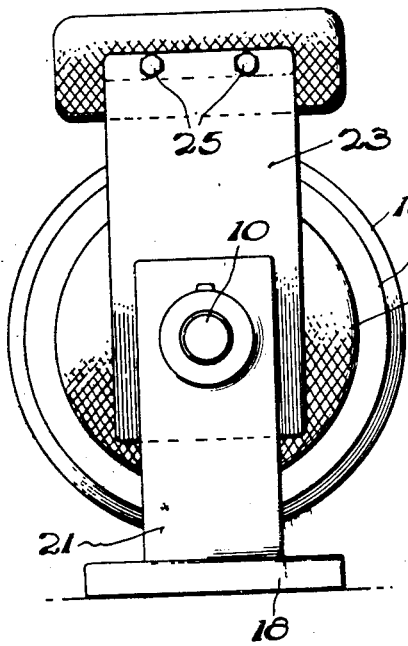
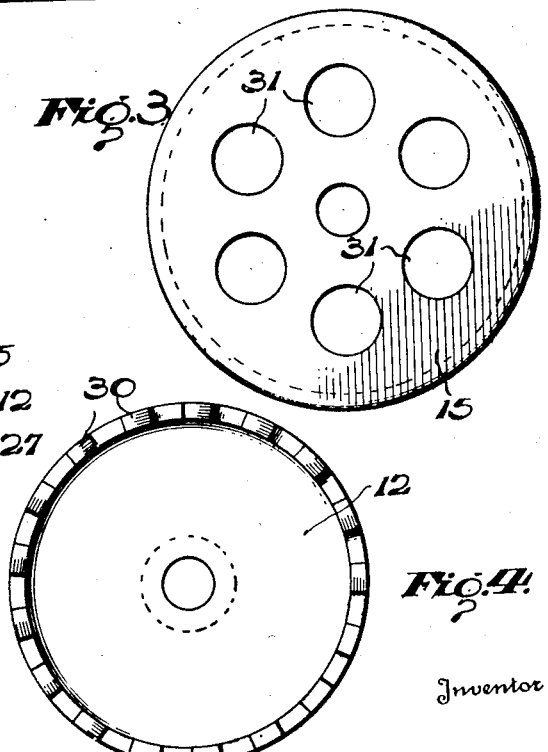
Inventor
John E. Allen
By Cameron Kerkam + Sutton
Attorney

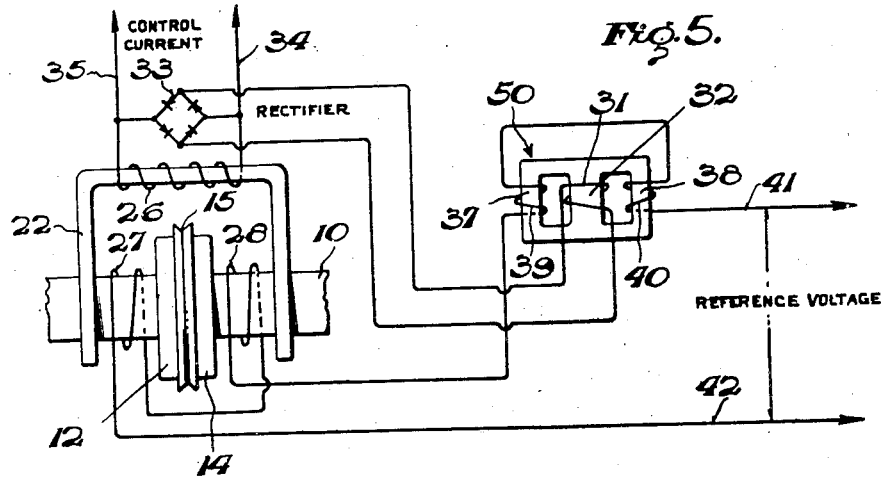
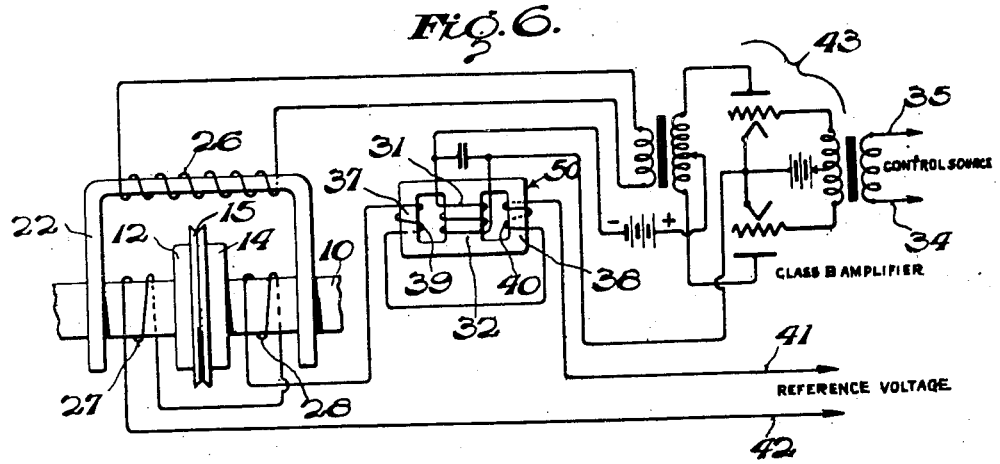
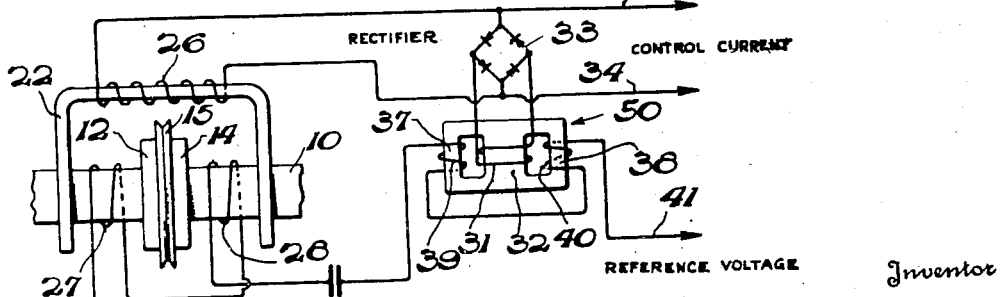

Nov. 16, 1948.  J. E. ALLEN  2,453,957
MAGNETIC CLUTCH

Filed Aug. 22, 1945  3 Sheets-Sheet 3

Inventor
John E. Allen.
By Cameron, Kerkam & Sutton
Attorneys

Patented Nov. 16, 1948

2,453,957

UNITED STATES PATENT OFFICE 2,453,957

MAGNETIC CLUTCH

John E. Allen, Baltimore, Md.

Application August 22, 1945, Serial No. 612,063

20 Claims. (Cl. 192—84)

This invention relates to a magnetic clutch, and more particularly to a magnetic clutch which will function as an electromechanical amplifier or control for measuring electrical values or operating suitable instrumentalities resopnsively to electrical values.

It is a growing practice in electronic control and measuring circuits employing the continual balance or null principle to use a two-phase reversible induction motor as an actuator or servomotor, with one phase of the motor energized from an alternating current reference voltage and the other phase energized from an amplifier to provide reversal of rotation when the phase angle is reversed 180°. Commutator motors are also sometimes used under direct current control as reversible actuators. But two-phase alternating current motors offer advantages in many circuits, and therefore it is desirable to utilize these advantages when possible.

It is an object of the present invention to provide an actuator of the magnetic clutch type which incorporates certain desirable functions common to a two-phase induction motor.

When very high speeds of acceleration, stopping and reversal are needed, reversing motors are unsatisfactory due to their high inertia. Additionally, the stalled rotor torque for a given electrical input is relatively low, thereby necessitating large and expensive motors and amplifiers when a torque direct from the rotor is required on the order of a foot pound or more. It is generally recognized that the response of a magnetic clutch is inherently faster to electrical control than from a motor, a recorder employing a magnetic clutch that responds faithfully to a frequency up to sixty cycles per second having been described by E. H. Bedell in "A High-Speed Level Recorder for Acoustic Measurements," Bell Laboratories Record, November 1934, page 75. Heretofore, magnetic clutches have been used to good advantage in a limited number of applications for high speed measuring and controlling, but as heretofore proposed, they have been at a disadvantage because of certain mechanical and electrical features thereof. In particular, their electrical design has been such that reversible motion was secured only by the selective actuation of two independent electrical windings requiring special amplifiers and complicated circuits to effect directional control of the mechanical parts. In some commercial designs direct current has been used to energize the selective control windings, but this has greatly restricted the field of application.

It is an object of the present invention to obtain reversible motion by a polarity reversal of the voltage applied to a single electrical winding and thereby overcome the disadvantages implicit in the selective actuation of two independent electrical windings.

Another object of this invention is to provide a magnetic clutch securing reversal of motion by a polarity reversal of the voltage applied to a single electrical winding in combination with a second winding energized from a reference voltage to make the clutch function similarly to a two-phase induction motor.

Another object of this invention is to provide a magnetic clutch of the type above characterized wherein the windings may be energized from either direct or alternating current and when the latter is used there is no mutual induction between the windings.

Another object of this invention is to provide a magnetic clutch of the type above characterized whereby reversible motion is obtained by means of a polarity or 180° phase angle reversal that is applicable to bridge circuits of the null balance type.

Another object of this invention is to provide a magnetic clutch as above characterized whereby, by using alternating current control, the field of application of such a device is greatly enlarged and the use of conventional alternating current amplifiers is facilitated.

Another object of this invention is to provide a magnetic clutch as above characterized which functions as an electromechanical amplifier so that for a given electrical power input the torque obtainable at standstill is many times greater than from a conventional two-phase induction motor, whereby electronic amplifiers with relatively low power rating may be used with substantial savings in cost.

Magnetic clutches as heretofore proposed have exerted constantly opposing pressures between the driving members and the driven member with the result that they are subject to constant wear between the rubbing surfaces when no motion of the driven member is required. Another object of this invention is to provide a magnetic clutch which minimizes wear between the rubbing surfaces, when no motion of the driven member is required, by maintaining the opposed magnetic forces between the driving and driven members at a low or zero value under such conditions, and yet one which is quickly and accurately responsive when the driven member is called upon to come into operation.

Another object of this invention is to provide a magnetic clutch of the type above characterized which is well adapted to applications for measurement and control that require very high speed of response to bridge circuits of the continually balanced type.

Another object of this invention is to provide a magnetic clutch of the type above characterized which is adaptable either to small units with an output of a few inch ounces, as required for measuring instruments, or to large automatic control units of the power type, such as actuators or servomotors, having an output of many foot pounds.

Another object of this invention is to provide a magnetic clutch of the type last characterized in which the clutch functions as an electromechanical amplifier so that substantial economies in the electronic amplifiers associated therewith can be realized.

Another object of this invention is to provide an electrical clutch of the type above characterized which is capable of fast acceleration and reversal, free from overshooting, and quickly damped.

Another object of this invention is to provide a magnetic clutch of the type above characterized which is accurately responsive to small electric currents and capable of developing increased mechanical power for actuating control mechanisms as well as measuring or recording mechanisms.

Other objects of the invention will appear as the description thereof proceeds.

The invention is capable of receiving a variety of expressions, some of which are illustrated in the accompanying drawings, but it is to be expressly understood that the drawings are for purposes of illustration only and are not to be construed as a definition of the limits of the invention, reference being had to the appended claims for that purpose.

Referring in detail to the accompanying drawings wherein like parts are designated by like reference characters, Fig. 1 is a diagrammatic axial section of a magnetic clutch embodying the present invention;

Fig. 2 is an end view of the structure of Fig. 1;

Fig. 3 is a face view of the driven member;

Fig. 4 is a face view of one of the clutch discs;

Figure 8:
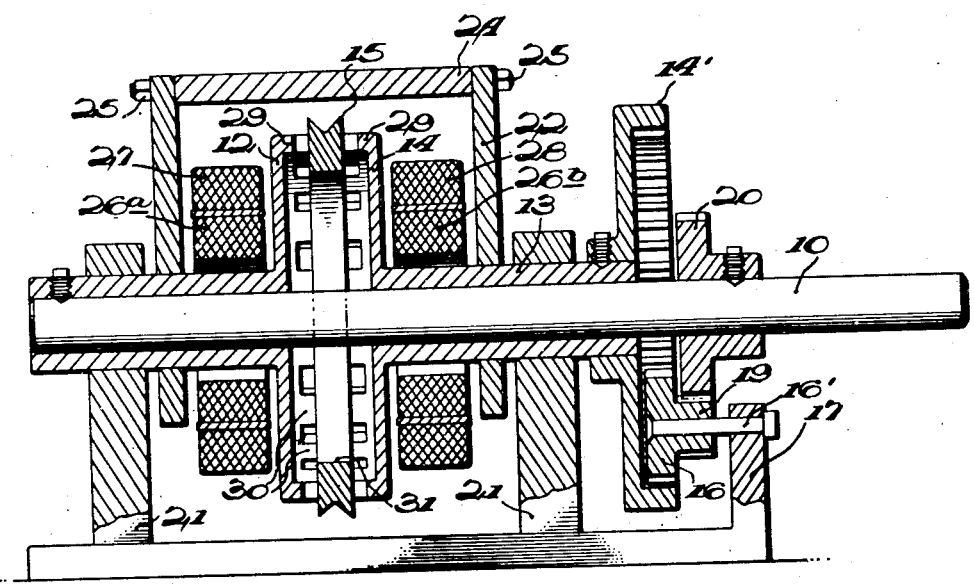

Figs. 5, 6 and 7 are circuit diagrams illustrating alternative provisions for diminishing wear of the relatively rotatable parts by reducing the opposed magnetic forces between the driving and driven members to a low or zero value when no motion of the driven member is required; and Fig. 8 is a diagrammatic axial section generally corresponding to Fig. 1 to illustrate another embodiment of the invention.

First referring to the embodiments of Figs. 1 to 4, 10 is a driving shaft of non-magnetic material attached to any suitable driving motor (not shown). Fixedly attached to shaft 10, as by a key, set screw or other suitable provision, is a sleeve 11 of magnetic material having formed thereon or suitably attached thereto a clutch disc 12, also of magnetic material. A second sleeve 13 of magnetic material is mounted on the shaft 10 for rotation with respect thereto and has formed thereon or suitably attached thereto a clutch disc 14 of magnetic material which is preferably identical with the clutch disc 12. Interposed between said clutch discs 12 and 14 is a driven member 15 in the form of a disc of magnetic material and here shown as grooved so that it may constitute a pulley, although it is to be expressly understood that any other suitable type of driven member may be used depending upon the type of measuring or control instrumentality with which the clutch is associated.

Suitably attached to sleeve 13, as by a set screw, key or like provision, is an internal gear 14', and meshing with the internal teeth thereof is a spur gear 16 mounted on a stud shaft 16' suitably carried by a bracket 17 projecting from the base 18 of the structure. Fixed to spur gear 16 is a second and smaller spur gear 19 in mesh with a spur gear 20 fixed to the shaft 10 in any suitable way. Gears 14' and 20 have a two to one ratio as do also spur gears 16 and 19 so that the discs 12 and 14 are rotated in opposite direction at equal speeds. However, it is not an essential requirement that the speeds of discs 12 and 14 be equal. In some applications the speed of the driven member 15 may be required to be different in the forward direction than in reverse. Any difference in speeds desired may readily be obtained by a simple change of gear ratios. While the foregoing drive for the clutch discs 12 and 14 has the advantage of simplicity, compactness and low structural cost, it is to be expressly understood that any other suitable gear train may be employed to rotate the discs 12 and 14 at equal speeds in opposite directions. Sleeves 11 and 13 as shown are rotatably mounted in bearing brackets 21 projecting upwardly from the base 18, but as the drawing is intended to be only diagrammatic in this respect it is to be understood that any suitable bearing provision may be made for the rotatable parts.

Suitably mounted on the base 18 and held from rotation in any suitable way is a U-shaped yoke 22 of magnetic material, here shown as composed of a pair of rectangular end members 23 (Fig. 2) united by a similar magnetic member 24 suitably attached to the end members 23 as by bolts or screws 25. End members 23 are preferably in rubbing contact with the sleeves 11 and 13 so that no air gaps exist at these locations. Wound on member 24 is an elongated coil 26 which is preferably used for the control circuit but which as will hereinafter appear may also be used for the reference voltage. Coil 26 thus energizes a simple closed magnetic circuit comprising yoke 22, sleeves 11 and 13, discs 12 and 14, and driven member 15. Surrounding the sleeves 11 and 13 contiguously to the clutch discs 12 and 14 and supported from the frame in any suitable way are a pair of coils 27 and 28 which are oppositely wound and have an equal number of turns. Because the fluxes from coils 27 and 28 are bucking, the two magnetic circuits may be considered as having air gaps. Coils 27 and 28 are preferably used for the reference voltage but as will hereinafter appear, may also be used for the control circuit. Such slight relative axial movement exists between the driven disc 15 and the clutch discs 12 and 14 as is required to provide for the clutching functions hereinafter described.

Clutch discs 12 and 14 may be of any suitable diameter, but preferably they approximate the diameter of the driven member 15 as shown, so as to obtain the maximum mechanical advantage. Each clutch disc at its periphery is provided with an inwardly directed flange 29 whose inwardly faced periphery has rubbing contact with a face of the driven member 15. Said flange 29 may be of any suitable radial dimension, but it is preferably made a relatively thin flange consistent with requisite structural strength and capacity to maintain the necessary frictional driving contact by magnetic attraction between the same and the face of the driven member 15. While said flange 29 may be uninterrupted so as to provide a 360° contact with the face of the driven member 15, I preferably interrupt the face of the flange contacting the driven member 15 as by forming the same with notches or teeth 30, as such a construction appears to produce through aeration of the rubbing metallic surfaces a rapid development of the fretting corrosion that underlies satisfactory development of a friction drive. Driven member 15 preferably has its inertia reduced by providing perforations 31 between its center and the peripheral regions thereof coacting with the clutch discs 12 and 14.

As so far described it will be apparent that driven member 15 is common to two magnetic circuits with air gaps composed of the yoke 22, sleeves 11 and 13, discs 12 and 14 and driven member 15. If coils 27 and 28 are energized from a reference D. C. voltage providing a common source of high flux density, and as said coils are equal and reversely wound, they produce equal and opposed or bucking fluxes acting on the interposed driven member 15. Thus magnetic attraction will be set up between the clutch discs 12 and 14 and the member 15, and because of the friction existing between the clutch discs 12 and 14 and said member 15 each of said clutch discs will tend to drive said member 15, but as said clutch discs are being driven at equal speeds in opposite directions and the magnetic attraction exerted by the coils 27 and 28 is equal, the equal and opposite frictional forces will be neutralized so that member 15 will remain stationary. Since the frictional force is independent of velocity within wide limits it is not essential that the discs 12 and 14 rotate at exactly the same speed. If, however, a D. C. control current is applied to the coil 26 the flux from the current of said coil will be additive to the flux in one of the coils 27 and 28 and subtractive as respects the other, whereby unbalanced magnetic forces now exist between driven member 15 and the clutch discs 12 and 14. The resultant unbalanced frictional force due to said unbalanced magnetic forces will cause the disc 15 to rotate in the direction corresponding to the clutch disc whose flux is additive to the flux of coil 26. A reversal of polarity of current in coil 26 will reverse the magnetic unbalance and cause the disc 15 to reverse its direction of rotation.

If said coils are energized with A. C. current from a common source, reversal of rotation will be effected by a 180° phase angle shift between the current in coil 26 and the potential on coils 27 and 28.

As shown in Fig. 3, two or more coils connected as a unit with additive fluxes may be used for control instead of the single coil 26. In this embodiment, which is like that of Fig. 1 in other respects, two equal coils 26a and 26b are located coaxially of coils 27 and 28.

While to explain the foregoing action the reference voltage has been assumed as applied to the coils 27 and 28, it has been found that the functions of the coils may be interchanged, i. e., the reference voltage may be applied to the coil 26 and the control current can be applied to the coils 27 and 28 but with some impairment in efficiency.

When the unbalance of magnetic force is removed the driven member 15 will come quickly to rest because, in addition to the frictional drag of the opposite clutch disc on member 15, the magnetic drag resulting from the cutting of the flux of high density by the rotating member 15 tends to prevent overshooting. On the other hand, the lightness of the disc 15 and the instantaneous application of unbalanced frictional forces arising from unbalanced magnetic forces due to the change of the phase angle or polarity in the coil carrying the control current assures rapid acceleration of disc 15 from rest or upon reversal.

As an illustration of one embodiment of my invention, coils 27 and 28 were connected in series opposition and had an impedance of 6 ohms at sixty cycles and $R_{D.C.}$ equal to 1.8 ohms, and coil 26 had an impedance of 360 ohms at sixty cycles and $R_{D.C.}$ equal to 135 ohms. All three coils were energized from the same sixty cycle source. The outside diameter of discs 12 and 14 was one inch and the projected area of flange 29 in contact with the driven member 15 was approximately 0.18 sq. in. Measured at a distance of 1⅛ inches from the center of disc 15 (the angular force would have been approximately twice the following values if measured at the flanges 29 of the construction illustrated in Fig. 1) the following values were obtained at varying current values on the control and reference coils:

| Reference Coils 27 and 28 in series | | Control Coil 26 | | Force Measured at Standstill at 1⅛" Radius—Oz. | |
|---|---|---|---|---|---|
| Amps. | Power V. A. | Amps. | Power V. A. | Clockwise | Counter Clockwise |
| .25 | .375 | .056 | 1.1 | 1.0 | 1.0 |
| .25 | .375 | .083 | 2.5 | 1.5 | 1.5 |
| .25 | .375 | .111 | 4.5 | 2.0 | 2.0 |
| .50 | 1.5 | .056 | 1.1 | 2.0 | 2.0 |
| .50 | 1.5 | .083 | 2.5 | 3.0 | 3.0 |
| .50 | 1.5 | .111 | 4.5 | 4.0 | 4.0 |
| .75 | 3.4 | .056 | 1.1 | 3.0 | 3.0 |
| .75 | 3.4 | .083 | 2.5 | 4.0 | 4.0 |
| .75 | 3.4 | .111 | 4.5 | 5.0 | 5.0 |
| 1.0 | 6.0 | .056 | 1.1 | 3.5 | 3.5 |
| 1.0 | 6.0 | .083 | 2.5 | 5.0 | 5.0 |
| 1.0 | 6.0 | .111 | 4.5 | 6.5 | 7.0 |

The above readings show that the clutch functions as an electromechanical amplifier. For instance, with one ampere in the reference coils and with an electrical input to the control winding of 1.1 volt amperes, the force measured at standstill at 1⅛ inch radius was 3.5 ounces or 7 ounces if measured at flange 29. For the same electrical power input this is many times the stalled rotor torque of an induction motor.

As heretofore pointed out, it is desirable when no movement of member 15 is desired that wear on the rubbing surfaces between member 15 and clutch discs 12 and 14 be minimized. However, it is to be understood that no impairment of performance would result from such wear until the flange 29 is worn off or the driven member 15 is worn through. In conformity with the present invention means are provided whereby the forces exerted on the member 15 by clutch discs 12 and 14 are reduced to a low or minimum value when no motion of the member 15 is required. However, when response of the member 15 becomes necessary the differential forces acting on member 15 are suitably increased.

Any suitable electrical system for effecting the foregoing result may be used, Figs. 5, 6 and 7, showing three circuits wherein a saturatable reactor 50 is inserted in series with the reference voltage coils 27 and 28.

The preferred form of saturatable reactor 50 is of the three-legged type in which the reactance is varied by means of direct current through a winding 31 on the center leg 32. In Fig. 5 coil 31 is in series with a rectifier 33 that takes a small portion of the control current from the leads 34 and 35 to the control coil 26.

Outside legs 37 and 38 of said saturatable reactor carry equal coils 39 and 40 in series so wound that their alternating current fluxes are additive and pass around the outside magnetic path of the reactor. None of the flux enters the center leg. The rectified direct current from the control source, i. e., leads 34 and 35, creates a flux in the center leg which has a path through both outside legs thus permitting control of the degree of saturation of the iron of the alternating flux path. The reactance of coils 39 and 40 thus varies as a function of the direct current in the center leg. When the voltage from the control source is zero there is no direct current in the center leg winding of the reactor, consequently the reactance of the coils 39 and 40 is at a maximum thereby reducing the current in the reference coils 27 and 28 to a minimum value, the condition desired for reduced wear on the metallic rubbing surfaces when no actuation of the disc 15 is required. However, when voltage is present from the control source the resulting flux from the rectified direct current creates a degree of saturation in the alternating flux path of coils 39 and 40 reducing the reactance and thereby increasing the current in the reference coils 27 and 28 so that increased torque is available from the disc 15.

Fig. 6 shows a like circuit arrangement except that in place of the rectifier 33 the increase of plate current in a class B amplifier circuit generally designated 43 is used to energize the center leg coil 31.

Still another arrangement is shown in Fig. 7 in which the saturatable reactor 50 becomes part of a series resonant non-linear circuit under the control of direct current in the center leg coil 31, direct current being supplied by rectifier 33, the circuit of Fig. 7 being otherwise the same as in Fig. 5.

The source of D. C. current can be either from a rectified proportion of the control current as shown in Figs. 5 and 7 or from a class B amplifier as shown in Fig. 6. In all of these circuits the current through the coils 27 and 28 is adjusted to a value sufficiently low so that the wear on the rubbing metal surfaces between member 15 and discs 12 and 14 is negligible in quantity as long as the control current is not active. When current flows in the control circuit, however, the reactor 50, under the control of a portion of the current from the control circuit, effects a manyfold increase in the voltage in coils 27 and 28 so as to operate the rotatable member 15 in the manner heretofore described.

Investigation of the angular force or torque exerted by the member 15 has demonstrated that the torque is a linear function of the current in the control coils, and also nearly proportional to the voltage applied to the reference or potential coils. Thereby the clutch of the present invention constitutes an accurate means for measuring, amplifying or controlling current values as applied to the current coils or the relative phase angle or polarity between the current and reference coils.

It will therefore be perceived that by the present invention a relatively simple, rugged and accurate device has been provided for actuating instrumentalities for measuring or controlling instrumentalities from sources of electrical current that may be relatively small. If amplification of said current before delivery to the magnetic clutch is desirable, ordinary eelctrical amplifiers may be used. At the same time the device is such that precision workmanship is not required in its construction, and therefore the desired operation can be obtained by constructions of relatively low cost. Devices according to this invention are readily adaptable to a wide variety of uses because the invention can be applied through a wide range of size as well as power output. Either D. C. or A. .C current may be used as preferred, and the advantages heretofore obtainable through use of two-phase reversible induction motors have been secured without the limitations imposed by the inherent functioning of motors of this type. As the inertia of member 15 can be kept relatively low, reversal and acceleration are obtained rapidly, and owing to the drag present because of the cutting of the magnetic lines of force as well as the friction between the relatively rotating surfaces, overshooting is avoided, on the one hand, and rapid retardation for stoppage or reversal is obtained, on the other hand. At the same time, when the clutch is provided with circuit means for minimizing the differential forces applied to the member 15 when rotation thereof is not required, wear of the relatively rotatable parts is reduced to a minimum without interfering with the prompt and accurate response of the clutch to current in the current coil or coils for measuring or control purposes. Furthermore, as shown by the foregoing table, the present invention provides an electromechanical amplifier which can be actuated by relatively small currents.

While what has been illustrated on the drawings has been described with considerable particularity, it is to be expressly understood that the invention is not restricted thereto, as the invention is capable of receiving a variety of expressions, some of which will now readily suggest themselves to those skilled in the art, while changes may be made in the sizes, proportions, details of construction, form and character of mechanical elements such as gearing for producing opposite rotation of the clutch members at either equal or unequal speeds as desired, the form of the driven member, number and placement of the control and reference coils, etc., and various circuit arrangements may be used for the control and potential coils, for reducing the opposed action of the reference coils when little or no current is flowing in the control coil or coils, etc., all without departing from the spirit of the present invention. Reference is therefore to be had to the appended claims for a definition of the invention.

What is claimed is:

1. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, one of said two last named means including a single coil, a control circuit connected with one of said coil means and a circuit for applying a reference voltage to the other of said coil means.

2. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising a pair of coils for applying equal and opposite magnetic fluxes to said driving and driven members, a circuit for applying a reference voltage to said coils, a single coil for reversibly unbalancing said fluxes, and a control circuit connected with said single coil.

3. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising a coil means for applying a common magnetic flux to said driving and driven members, a circuit for applying a reference voltage to said coil means, coil means for reversibly unbalancing the fluxes in the driving members, and a control circuit connected with said last named coil means.

4. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a single control circuit in circuit with one of said coil means, and a circuit for applying a reference voltage to the other of said coil means, said rotating means including an internal gear operatively connected to one of said driving members, a concentric external gear operatively connected to the other of said driving members, and gearing operatively connecting said internal and concentric gears for rotating the same at or about equal speeds in opposite directions.

5. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a single control circuit connected with one of said coil means, and a circuit for applying a reference voltage to the other of said coil means, said driven member including a rotatable disc provided with perforations intermediate the center and peripheral portions to reduce the inertia thereof.

6. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a single control circuit connected with one of said coil means, and a circuit for applying a reference voltage to the other of said coil means, each of said driving members including a disc provided with an axially extending flange having frictional contact with a face of said driven member.

7. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a control circuit connected with one of said coil means, and a circuit for applying a reference voltage to the other of said coil means, each of said driving members including a disc having an axially extending flange provided with dentations at its periphery for frictional contact with a face of said driven member.

8. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a control circuit connected with one of said coil means, and a circuit for applying a reference voltage to the other of said coil means, said circuit for applying a reference voltage including means for minimizing the magnetic flux when actuating current is absent from said control circuit.

9. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a control circuit connected with one of said coil means, a circuit for applying a reference voltage to the other of said coil means, and means controlled from said control circuit for reducing the magnitude of the magnetic flux when controlling current is absent from said control circuit.

10. A magnetic clutch including a magnetic driven member, a pair of driving magnetic members cooperating with said driven member at opposite sides thereof, means for rotating said driving members constantly at or about the same speed in opposite directions, means for actuating said driven member from said driving members and determining the direction of rotation of said driven member comprising coil means for applying equal and opposite magnetic fluxes to said driving and driven members, coil means for reversibly unbalancing said fluxes, a control circuit connected with one of said coil means, a circuit for applying a reference voltage to the other of said coil means, and a saturable reactor in circuit with said control circuit and said circuit for applying a reference voltage to minimize the magnetic flux applied to said driving and driven members when controlling current is absent from said control circuit.

11. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, and a circuit for applying a control current to the other of said coil means.

12. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, a pair of equal and oppositely wound coils in the respective magnetic circuits and respectively associated with said driving members, a single coil with its flux common to the two magnetic circuits, a circuit for applying a reference voltage to said pair of coils, and a circuit for applying a control current to said single coil.

13. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, a pair of equal and oppositely wound coils in the respective magnetic circuits and respectively associated with said driving members, a single coil with its flux common to the two magnetic circuits, a circuit for applying a reference voltage to said single coil, and a circuit for applying a control current to said pair of coils.

14. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, and a circuit for applying a control current to the other of said coil means, each of said driving members including a disc having an axially extending flange peripherally in contact with a face of said driven member.

15. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, and a circuit for applying a control current to the other of said coil means, each of said driving members including a disc having an axially extending flange dentated at its periphery for frictional contact with the face of said driven member.

16. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, and a circuit for applying a control current to the other of said coil means, said driven member being perforated intermediate its central and peripheral portions to reduce the inertia thereof.

17. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, a circuit for applying a control current to the other of said coil means, said driving means including an internal gear operatively connected to one of said driving members, a concentric external gear operatively connected to the other of said driving members, and gearing interposed between said internal and concentric gears for driving the latter from the former at or about the same speed but in the opposite direction.

18. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, a circuit for applying a control current to the other of said coil means, and means in circuit with said control circuit and circuit for applying a reference voltage for minimizing the magnetic flux acting on said driving and driven members when control current is absent from said control circuit.

19. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, a circuit for applying a control current to the other of said coil means, and a saturatable reactor in circuit with said control circuit and said circuit for applying a reference voltage for minimizing the magnetic flux applied to said driving and driven members when control current is absent from said control circuit.

20. A magnetic clutch including a magnetic driven member, a pair of driving magnetic members frictionally cooperating with the opposite faces of said driven member, means for rotating said driving members constantly at or about the same speed in opposite directions, two magnetic circuits each including said driven member and each including one of said driving members, coil means comprising a pair of equal and oppositely wound coils in the respective magnetic circuits and respectively associated with said driving members, coil means with its flux common to the two magnetic circuits, a circuit for applying a reference voltage to one of said coil means, a circuit for applying a control current to the other of said coil means, and means for minimizing the magnetic flux applied to said driving and driven members when control current is absent from said control circuit including a three-legged reactor, a coil associated with the middle leg of said reactor, means in circuit with said control circuit for applying a direct current to said coil, and coils on the lateral legs of said reactor in series in the circuit for applying a reference voltage.

JOHN E. ALLEN.

REFERENCES CITED

The following references are of record in the file of this patent:

UNITED STATES PATENTS

| Number | Name | Date |
|---|---|---|
| 752,589 | Riddell | Feb. 16, 1904 |
| 834,394 | Metcalf | Oct. 30, 1906 |
| 1,552,155 | Hawley | Sept. 17, 1925 |

FOREIGN PATENTS

| Number | Country | Date |
|---|---|---|
| 399,563 | Germany | July 25, 1924 |